United States Patent [19]

Krist et al.

[11] 4,430,438

[45] Feb. 7, 1984

[54] ENAMEL FRIT AND A PROCESS FOR TWO-LAYER AND MULTI-LAYER ONE-FIRE ENAMELLING

[75] Inventors: Otto Krist, Overath, Fed. Rep. of Germany; Heinz Drave, Baltimore, Md.; Jozef Luypaert, Brussels, Belgium

[73] Assignee: Bayer Aktiengesellschaft, Leverkusen, Fed. Rep. of Germany

[21] Appl. No.: 371,029

[22] Filed: Apr. 22, 1982

[30] Foreign Application Priority Data

May 5, 1981 [DE] Fed. Rep. of Germany ....... 3117706
Mar. 13, 1982 [DE] Fed. Rep. of Germany ....... 3209140

[51] Int. Cl.³ ............................................... C03C 5/00
[52] U.S. Cl. ........................................ 501/17; 501/20; 427/419.4
[58] Field of Search ................... 501/17, 20; 427/419.4

[56] References Cited

U.S. PATENT DOCUMENTS 1,833,087 11/1931 Migeot .................................. 501/17

3,906,124 9/1975 Carini et al. ......................... 427/309

FOREIGN PATENT DOCUMENTS

| 765711 | 10/1971 | Belgium | 501/20 |
| 506439 | 10/1954 | Canada | 501/20 |
| 18559 | 11/1980 | European Pat. Off. | 501/20 |
| 1217736 | 5/1966 | Fed. Rep. of Germany | 501/20 |
| 1217737 | 5/1966 | Fed. Rep. of Germany | 501/20 |
| 562174 | 5/1975 | Fed. Rep. of Germany | 501/20 |
| 2634843 | 2/1978 | Fed. Rep. of Germany | 501/20 |
| 2419983 | 10/1979 | France | 501/20 |
| 757490 | 8/1980 | U.S.S.R. | 501/20 |

*Primary Examiner*—James Poer
*Attorney, Agent, or Firm*—Sprung, Horn, Kramer & Woods

[57] ABSTRACT

The invention relates to a process for two-layer and multi-layer one-bake enamelling, in which saccharides and/or their oxidation, reduction and/or conversion products and/or polyethylene glycol are added during preparation of the ground enamel slip and, optionally, the intermediate enamel slip, the additives containing up to 50 carbon atoms per molecule.

9 Claims, No Drawings

ENAMEL FRIT AND A PROCESS FOR TWO-LAYER AND MULTI-LAYER ONE-FIRE ENAMELLING

This invention relates to an enamel slip containing additives and to a process for two-layer and multi-layer one-fire enamelling, certain organic substances being added to the ground coat slip to be initially applied to metal which effectively prevent intensive mixing of the various enamel layers during baking, without significantly affecting the flow properties of the slip and the wettability both of the metal and of the intermediate or cover coat applied as the next layer (or intermediate layer).

In conventional two-layer and multi-layer enamelling processes, a ground enamel slip is applied, dried and then baked in a first step. In a second step, another intermediate or even cover enamel slip is applied to the baked ground enamel layer, dried and then baked. In this way, it is possible in principle to produce multiple layers of which each individual layer is separately capable of performing the function assigned to it such as, for example, adhesion, masking the natural colour of the metal to be enamelled, colouring the enamel layer and determining the physical and chemical surface properties.

The disadvantage of the conventional multi-layer enamelling process lies in the fact that each slip has to be dried and baked after its application. Apart from a high energy consumption, this limits the capacity of the baking oven.

By contrast, the two-layer/one-bake process and, to an even greater extent, a multi-layer/one-bake process enables energy to be saved and, at the same time, the existing baking oven capacity to be utilised more effectively insofar as the same article only has to pass through the oven once.

Energy-saving two-layer/one-bake enamelling processes of this type are described in U.S. Pat. No. 2,602,758, in German Auslegeschrift No. 1,621,405 and in German Offenlegungsschrift No. 25 38 601.

According to U.S. Pat. No. 2,602,758, the crucial feature of the invention is said to be adapting the ground coat and the cover coat enamel to the same baking temperature. This is done by varying the layer thickness, i.e. by baking the ground enamel in the form of a very thin layer and the cover enamel in the form of a layer of conventional thickness.

The disadvantage of this process is that the required very thin ground enamel layer, which is characterised to an extent by the same layer thickness, can only be obtained by complicated and difficult coating processes which call for extreme care during the actual coating phase. Accordingly, this process has never been adopted for practical application in the harsh operational reality of an enamelling shop. In addition, this process is intended for special, selected enamellable sheet steels.

DT-AS No. 1,621,405 describes another process for two-layer enamelling in one-bake for white enamels, in which alakli metal aluminates and alkali metal, alkaline-earth metal or heavy metal phosphates are added to the ground enamel slip.

After application and subsequent drying to form the ground enamel biscuit, a titanium white enamel slip is applied and in turn dried. The two enamel biscuit layers are then baked in a single operation.

Although it is possible in some cases to obtain excellent enamel coatings by this process, it is nevertheless attended by the disadvantage that the large additions of aluminate and phosphate affect the flow properties of the ground enamel slip to a considerable extent, giving rise to difficulties in the various slip application processes (spray coating, dip coating, casting).

German Offenlegungsschrift No. 2,538,601 describes another two-layer/one-bake process in which, prior to application of the cover enamel slip, the predried ground enamel biscuit is protected against the uptake of water from the cover enamel by silicone-based impregnating agents. This hydrophobic impregnation is intended on the one hand to prevent the ground enamel biscuit from swelling when the aqueous cover enamel slip is applied and, on the other hand, to prevent corrosion of the sheet metal substrate. The impregnating agents mentioned may either be processed as a mill addition or may even be sprayed onto the dried ground enamel biscuit after dissolution in readily volatile organic solvents. In addition to the fire hazards which the solvents represent during the enamelling process, this process has one main disadvantage, namely: although the impregnating layer prevents water from penetrating into the ground enamel layer from the cover enamel slip, it also prevents water from leaving the so-called "dry" ground enamel biscuit in the same way and to the same extent. Even after intensive drying, the ground enamel biscuit still contains chemically bound water in the form of OH-groups on enamel frit particles or on metal hydroxides or in the form of substantially involatile water of crystallisation bound to clay and other mill additions.

Preventing water from escaping from the ground enamel biscuit can result in faulty enamelling (particularly when this system is baked), depending on how the impermeability to water of the impregnating layer deteriorates during heating and on the temperature beyond which the impregnating agent decomposes. In addition, the decomposition products of the impregnating agent may lead through polymerisation or combustion during baking to undesirable secondary reactions and enamelling faults.

A new process has now surprisingly been found which avoids the disadvantages of the processes mentioned above and which may be universally applied to any known enamel frits processible by conventional two-bake and multiple-bake methods.

The subject of the invention is a process for two-layer and multi-layer one-bake enamelling by the successive wet application of ground enamel slips, optionally intermediate enamel slips and cover enamel slips, followed by baking, characterised in that saccharides and/or their oxidation, reduction and/or conversion products (e.g. alkylated or esterified carbohydrates or formaldehyde condensation products) and/or polyethylene glycol are added during preparation of the ground enamel slip and, optionally, the intermediate enamel slip, the additives containing up to 50, preferably up to 25, carbon atoms per molecule. The additives are intended to be at least partly soluble in the aqueous-alkaline enamel slip and to have no hydrophobising effect.

As polyethylene glycols in the sense of this invention may be used ethylene glycol, diethylene glycol, triethylene glycol, etc., up to polyethylene glycol with a maximum number of carbon atoms as disclosed above.

If in the following shortly carbohydrates are mentioned, also polyethylene glycols shall be comprised.

The carbohydrates should preferably contain more than 4 and, with particular preference, more than 5 carbon atoms per molecule.

At least some of the additives, for example 30% and better still 50%, should with particular preference contain between 6 and 20 carbon atoms per molecule.

At least some of the additives, for example 30% and better still 50%, should with particular preference contain between 6 and 30 carbon atoms per molecule.

The additives are best used in quantities of less than 5% by weight, based on the enamel slip. Quantities of from 0.1 to 3% by weight are preferred, quantities of from 0.01 to 0.5% by weight being particularly preferred.

The additives may be added to the enamel at the dry- or wet-grinding shape. However, the additives may also be applied in aqueous or alcoholic solution to the already applied enamel slip, optionally after intermediate drying, before application of the next slip, for example by spraying.

The additives are applied to the unground enamel frit with particular preference before the grinding stage. In this way the introduction of the additive can already be performed by the enamel manufacturer. This allows selection of the additives and the quantities thereof to suit the specific composition of the untreated frit, so that the relatively rough enamelling works are relieved of this. In addition it is possible to use less water-soluble additives even during the wet grinding of the frit.

Accordingly, the present invention also relates to an enamel frit for two-layer and multi-layer one-bake enamelling, which is characterised in that the surface of the frit is at least partially coated with saccharides and/or their oxidation, reduction and/or conversion products and/or polyethylene glycol, the additives containing up to 50, preferably up to 25, carbon atoms per molecule.

The additives are best applied in quantities of less than 3% by weight, based on the frit. Quantities of 0.006 to 1.8% by weight, preferably 0.06 to 0.3% by weight are preferred.

The frit according to the invention can be processed to a coatable slip in the enamelling works in the customary manner by grinding and adding customary additional slip constituents.

The ground enamel slip is applied to the metal substrate by standard coating techniques. After a short time, another intermediate enamel slip or a cover enamel slip may be applied without any need for intermediate drying. Where an intermediate layer is applied, one of the additives according to the invention must also be added to the intermediate layer slip, or, for the production of the intermediate layer slip a frit according to the invention must be used. The cover enamel slip can also, without any disadvantage, contain the additives according to the invention. This is, for example, appropriate in cases where another, for example, decorative coloured layer is applied to the cover layer only partly covering this. After all the layers applied have been dried together, the final enamel is baked at the usual temperatures. The properties of the enamel (adhesion, surface quality, etc.) are entirely comparable with those of enamels obtained by conventional methods.

The process according to the invention has the following advantages over conventional two-layer/one-bake enamelling processes:

1. The addition of specific quantities of carbohydrates has hardly any effect upon the flow properties of the enamel slips (rheology).
2. It is possible to use enamel slips ground to the usual fineness.
3. Intermediate drying of the ground enamel slip applied first of all is only necessary in exceptional cases (i.e. for considerable layer thicknesses).
4. By virtue of the non-hydrophobising effect of the additives (in contrast to impregnating agents), the residual water is also able to escape without interference from the dried enamel biscuit during baking.
5. Hardly any harmful reaction products of the additive occur and cause problems during baking because, depending on the degree of polymerisation, the carbohydrates already contain a large proportion of the oxygen required for their complete combustion in the molecule; the excessive reduction of metal oxides of the enamel by the organic additives, which of course have ultimately to be completely burnt, is also avoided in this way.

The process according to the invention is all the more surprising insofar as, hitherto, any expert on enamels has always regarded carbohydrates in the biscuit of an object to be enamelled as a dangerous source of failure to the enamelling process, resulting in faults known as cola or lemonade spots which give rise to colour flaws. On the other hand, enamelling shop personnel wear gloves when transferring the articles to be enamelled from the drying chain to the over chain in order to avoid finger prints on the dried enamel biscuit through hand perspiration or food remains. Finger prints such as these lead to faulty enamelling.

The invention is by means limited to enamels in the classical sense and may also be applied to related systems, such as cermets for example.

The process according to the invention can in general be employed in the above described form with outstanding results for the customary enamelling of sheet metal. It has however been found that the possibilities for variation of the remaining parameters such as the quality of the sheet metal, the pretreatment of the sheet metal, the adjustment of the slip with the customary additional slip additives and the baking conditions can be considerably widened if the ground enamel powder has a certain particle size distribution after grinding.

Thus the particle size of the enamel powder should preferably be less than $70\mu$. Particle sizes of less than $60\mu$, which are obtained by grinding the frit until the sieve residue on a sieve with 10,000 mesh/cm$^2$ (244 mesh) is at most 3% by weight and removing the residue, are used with particular preference. Outstandingly suitable particle size distributions are characterised by the following parameters: 100% by weight smaller than $60\mu$, and at least 75% by weight, preferably at least 85% by weight, larger than $20\mu$ and at least 50% by weight, preferably at least 70% by weight, smaller than $50\mu$.

A further possibility for a reduction in the requirements imposed on the quality and pretreatment of the sheet metal consists in the choice of particularly suitable compositions of the untreated frits. It has been found that when using the frit compositions more closely described in the following even cast iron and non-decarburized steels can be enamelled flawlessly by the two-layer one-bake process according to the invention.

Preferably the untreated frits to be used according to the invention for the ground enamel layer have the following composition:

| | | |
|---|---|---|
| $SiO_2$ | 30-50% by weight | total 33-53% by weight |
| ZrO | 0-8% by weight | |
| $Ba_2O_3$ | 5-21% by weight | |
| BaO | 14-25% by weight | total 33-40% by weight |
| ZnO | 0-5% by weight | |
| F | 0-4% by weight | |
| alkali metal oxides | 10-15% by weight | |
| adhesive oxides | 1-4% by weight | |
| CaO | 0-5% by weight | total 0-7% by weight |
| SrO | 0-5% by weight | |
| $TiO_2$ | 0-5% by weight | |
| $Fe_2O_3$ | 0-5% by weight | |
| $P_2O_5$ | 0-2% by weight | |

CoO, NiO, MnO and/or CuO are usually employed as adhesive oxides.

The alkali metal oxides preferably contain a maximum of 80% of $NaO_2$ and beyond that $LiO_2$ and/or $K_2O$. The sum of weight-percentages of the above mentioned oxides shall amount to at least 98%, preferably equal 100%. Additional constituents may be present in such amounts as such constituents are inevitable introduced into the frit as natural constituents of the raw materials forming the raw batch.

According to the invention, the untreated frits for the process according to the invention are particularly preferably surface coated with hydrocarbons.

As mixed ground coat frits are usually used for the ground coat slip, preferably at least 50% by weigth, particularly preferred 60% by weight of the total frit content of the slip are such preferred frit compositions.

By means of the combination preferred according to the invention of a frit preferably coated with hydrocarbons and the subsequent adjustment of the particle size destribution, according to the invention a system for an extremely robust 2-layer one-bake enamelling process is made available which is superior to customary multi-bake enamelling processes with respect to its susceptibility to varying substrate qualities and their pretreatment, as well as the slip adjustment and the baking conditions. Even, in general, relatively difficult edge enamellings do not present any problems.

The invention is illustrated further by the following examples:

EXAMPLES 1 TO 6

Ground enamel slips numbers 1 to 6 in Table 2 were prepared from ground enamel frits A, B, C and D having the chemical analysis shown in Table 1. The frit constituents, mill additions and additives were ground in a ball mill to a fineness defined by a residue of less than 5% on a 3600 mesh/cm$^2$ sieve. Each slip was then sprayed onto a sheet of steel pretreated by a standard pickling process.

A white enamel slip (Examples 1 to 6) was obtained by grinding a frit having the following chemical composition: 44% of $SiO_2$, 17% of $B_2O_3$, 7.5% of $Na_2O$, 7.8% of $K_2O$, 1% of $Li_2O$, 1.2% of $ZrO_2$, 19% of $TiO_2$, 1.2% of $P_2O_5$ and 1.3% of F, with mill additions of 3.5 parts of clay, 1.5 parts of highly disperse $SiO_2$, 0.3 part of $NaAlO_2$, 0.2 part of $K_2CO_3$ and 45 parts of water to 100 parts of frit (percentages by weight and parts by weight).

The white enamel slip was applied to the metal plates coated with the 6 ground enamel slips and then dried.

The plates thus enamelled were then baked together in the usual way for 3 minutes at 820° C.

TABLE 1

| Composition | Frit A | B | C | D |
|---|---|---|---|---|
| $SiO_2$ | 48 | 46 | 37 | 47 |
| $Al_2O_3$ | 6 | 7 | 4 | 4 |
| $B_2O_3$ | 16 | 15 | 19 | 6 |
| $Na_2O$ | 19 | 14 | 15 | 18 |
| $K_2O$ | 4 | 3 | 4 | 2 |
| CaO | 5.2 | 6.7 | 10 | 10 |
| NiO | 1.3 | 0.4 | 1.5 | 1 |
| CoO | 0.3 | 0.4 | 0.5 | 0.2 |
| MnO | — | — | — | 1 |
| $P_2O_5$ | — | 2.1 | 0.6 | 2 |
| BaO | — | 1.4 | 4 | 6 |
| $Fe_2O_3$ | — | 2 | — | 0.4 |
| CuO | — | — | 0.2 | — |
| $F^-$ | 1.2 | 2 | 4.2 | 6.2 |

(figures in parts by weight)

TABLE 2

| | Ground enamel slip number | | | | | |
|---|---|---|---|---|---|---|
| | 1 | 2 | 3 | 4 | 5 | 6 |
| Frit: | | | | | | |
| A | 25 | 25 | 20 | 20 | 30 | 30 |
| B | 25 | 25 | 20 | 20 | 40 | 30 |
| C | 50 | 50 | 40 | 40 | 30 | 40 |
| D | — | — | 20 | 20 | — | — |
| Mill additions: | | | | | | |
| $SiO_2$ (quartz) | 15 | 10 | 15 | 10 | — | 10 |
| Clay | 3 | 6 | — | 5 | 7 | 7 |
| $NaNO_2$ | 0.1 | 0.1 | 0.1 | 0.1 | 0.1 | 0.1 |
| $NaAlO_2$ | 0.3 | — | 0.8 | 0.3 | 0.2 | 0.2 |
| $Na_4B_2O_7.10H_2O$ | 0.1 | 0.3 | 0.1 | — | 0.1 | 0.2 |
| K—feldspar | — | 5 | — | — | 5 | — |
| Ca—silicate-hydrate | 0.5 | — | 0.5 | — | — | — |
| $H_2O$ | 45 | 50 | 40 | 45 | 45 | 50 |
| Examples of additions according to the invention: | | | | | | |
| Mannitol | 0.03 | 0.2 | 0.1 | — | 2 | — |
| β-D-fructofuranosyl-α-D-glucopyranoside | — | 1 | — | 0.5 | — | — |
| Dextrin | — | 0.2 | 2 | — | — | — |
| Polyethylene glycol MW 400 | — | — | — | — | — | 0.2 |

(figures in parts by weight)

EXAMPLES 7 TO 18

Using a frit having the following composition: 45% of $SiO_2$, 10% of $Al_2O_3$, 14.5% of $B_2O_3$, 4.9% of $TiO_2$, 12% of $Na_2O$, 4.3% of $K_2O$, 4.1% of CaO and 5.2% of F, a semi-opaque enamel slip was ground in the presence of 4 parts of clay, 0.5 part of $K_2CO_3$, 40 parts of water and 5 parts of pigment to 100 parts of frit. Various commercial rutile and/or spinel pigments were used as the pigments. The slips were applied to 6 metal plates each coated with ground enamel slips as in Examples 1 to 6, dried and baked.

EXAMPLES 19 TO 24

Using a frit of the following composition: 53% of $SiO_2$, 10.3% of $Al_2O_3$, 14.5% of $B_2O_3$, 12% of $Na_2O$, 4.3% of $K_2O$, 4.1% of CaO and 1.8% of F, a transparent enamel slip was prepared by the addition of 4 parts of clay, 0.3% of $K_2CO_3$, 40 parts of water and 4 parts of various commercial silicate pigments, cadmium sulphide and cadmium sulphoselenide pigments.

The slips were applied to metal plates coated with ground enamel slips as in Examples 1 to 6 and dried and baked in the same way.

EXAMPLE 25

An intermediate white containing 0.3 parts of mannitol as the addition according to the invention was applied to the ground enamel biscuit according to Example 5 using slip number 5 according to Table 2 and then dried. A majolica slip having the following frit composition: 46% of $SiO_2$, 3% of $Al_2O_3$, 40% of $B_2O_3$, 19% of $Na_2O$, 3% of $K_2O$, 2% of MnO, 7% of $Fe_2O_3$, 4% of $TiO_2$ and 2% of F, was then added to this two-layer biscuit, followed by drying and baking.

Enamels 1 to 25 were crack-free and did not show any bubble formation. No peeling off from the sheet steel substrate was observed in impact tests. No enamelling faults, such as pinholes or black spots, were observed, i.e. the enamels were satisfactory.

EXAMPLE 26

A ground enamel of the composition:
$SiO_2$—39.1% by weight
$Al_2O_3$—1% by weight
$B_2O_3$—16% by weight
$Na_2O$—6% by weight
$K_2O$—3% by weight
$Li_2O$—3% by weight
BaO—21% by weight
CaO—4% by weight
ZrO—1% by weight
$P_2O_5$—0.5% by weight
CoO—0.7% by weight
NiO—2.5% by weight
CuO—0.5% by weight
is melted from customary raw materials and granulated by pouring into a water bath. The water bath contained such a quantity of β-D-fructofuranozyl-α-D-glucopyranozide dissolved therein that 0.01% by weight of the addition adhered to the dried frit (granulate). Then 70 parts by weight of this frit and 30 parts by weight of frit A, which was coated with 0.02 parts by weight of mannitol, together with 15 parts by weight of $SiO_2$ (quartz)
3 parts by weight of clay
0.1 parts by weight of $NaNO_2$
0.3 parts by weight of $NaAlO_2$
0.1 parts by weight of $Na_4B_2O_7 \cdot 10 H_2O$
0.5 parts by weight of Ca-silicate hydrate
and 45 parts by weight of water, was ground in a ball mill to a fineness defined by a residue of less than 3% by weight on a 10,000 mesh/cm³ (244 mesh) sieve.

The slip was sprayed onto a sheet of steel which had been degreased in a customary manner. The sheet of steel had a thickness of 2 mm and was bent by 90° with a bending radius of 2 mm. Then the covering enamel was applied according to Examples 1 to 6 in the manner described therein and baked. A flawless enamelling was obtained which did not spall even on the bent edge.

We claim:

1. A process for two-layer and multi-layer one-bake enamelling of metal sheets by the successive wet application of aqueous ground enamel slips, optionally intermediate enamel slips and cover enamel slips, followed by baking, characterised in that saccharides and/or their oxidation, reduction and/or conversion products and/or polyethylene glycol are added during preparation of the ground enamel slip and, optionally, the intermediate enamel slip, the additives containing up to 50, preferably up to 25, carbon atoms per molecule.

2. A process according to claim 1, characterised in that the additives are present in quantities of from 0.01 fo 3% by weight, preferably from 0.01 to 0.5% by weight.

3. A process according to claim 1 or 2, characterised in that the additives contain more than 4 and preferably more than 5 carbon atoms per molecule.

4. A process according to any of claim 1 to 3, characterised in that alkylated and/or esterified carbohydrates and/or formaldehyde condensation products are present as the additives.

5. A process according to cue of claims 1 to 4, characterised in that the ground enamel powder has a particle size of less than 60µ.

6. A process according to any of claims 1 to 5, characterised in that a ground enamel of the following composition is employed:

| | | |
|---|---|---|
| $SiO_2$ | 30–50% by weight | total 33–53% by weight |
| ZrO | 0–8% by weight | |
| $B_2O_3$ | 5–21% by weight | total 33–40% by weight |
| BaO | 14–25% by weight | |
| ZnO | 0–5% by weight | |
| F | 0–4% by weight | |
| alkali metal oxides | 10–15% by weight | |
| adhesive oxides | 1–4% by weight | |
| CaO | 0–5% by weight | total 0–7% by weight |
| SrO | 0–5% by weight | |
| $TiO_2$ | 0–5% by weight | |
| $Fe_2O_3$ | 0–5% by weight | |
| $P_2O_5$ | 0–2% by weight. | |

7. An enamel frit for two-layer and multi-layer one-bake enamelling, characterised in that the surface of the frit is at least partially coated with saccharides and/or their oxidation, reduction and/or conversion products and/or polyethylene glycol, the coating substances having up to 50, preferably up to 25, carbon atoms per molecule.

8. An enamel frit according to claim 7, characterised in that the coating substances are present in quantities of up to 3% by weight, preferably 0.006 to 1.8, and particularly preferably 0.006 to 0.3% by weight, relative to the weight of the frit.

9. An enamel frit according to one of claims 7 or 8, characterised by a composition (without coating) of

| | | |
|---|---|---|
| $SiO_2$ | 30–50% by weight | total 33–53% by weight |
| ZrO | 0–8% by weight | |
| $B_2O_3$ | 5–21% by weight | total 33–40% by weight |
| BaO | 14–25% by weight | |
| ZnO | 0–5% by weight | |
| F | 0–4% by weight | |
| alkali metal oxides | 10–15% by weight | |
| adhesive oxides | 1–4% by weight | |
| CaO | 0–5% by weight | total 0–7% by weight |
| SrO | 0–5% by weight | |
| $TiO_2$ | 0–5% by weight | |
| $Fe_2O_3$ | 0–5% by weight | |
| $P_2O_5$ | 0–2% by weight. | |

* * * * *